Nov. 6, 1923.

J. LAMB 1,472,918

SPRING TIRE FOR VEHICLE WHEELS

Filed Aug. 2, 1923

Inventor:
John Lamb.

By his Attorney:
Walter Gunn

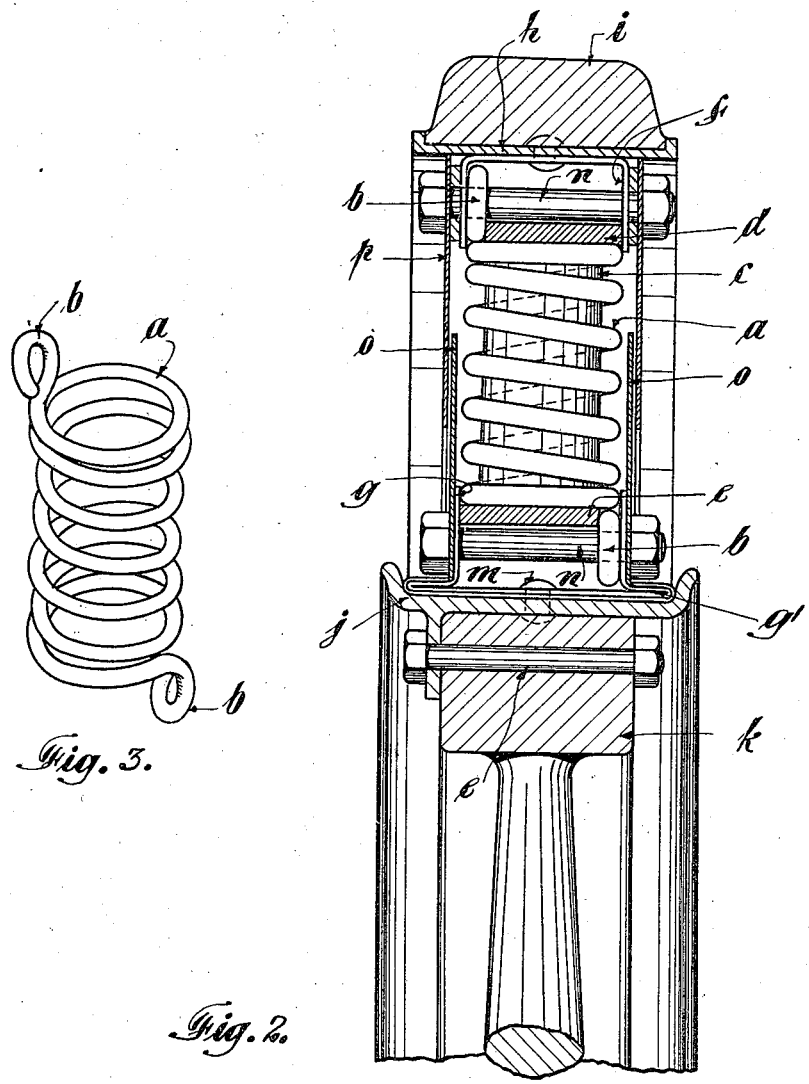

Patented Nov. 6, 1923.

1,472,918

UNITED STATES PATENT OFFICE.

JOHN LAMB, OF OLDHAM, ENGLAND, ASSIGNOR OF ONE-HALF TO JOHN BRUNYEA WILSON, OF OLDHAM, LANCASTER, ENGLAND.

SPRING TIRE FOR VEHICLE WHEELS.

Application filed August 2, 1923. Serial No. 655,362.

*To all whom it may concern:*

Be it known that I, JOHN LAMB, a subject of the King of Great Britain and Ireland, residing at Oldham, in the county of Lancaster, England, have invented new and useful Improvements in Spring Tires for Vehicle Wheels, of which the following is a specification.

This invention relates to spring tires for automobile and the like wheels.

According to the invention the improved tire consists of a series of spiral springs arranged at equal distances apart around the circumference of the tire, each spring at each end being formed with an eye or loop to receive cross pins or bolts passing through the limbs of channel shaped brackets. The brackets at the outer ends of the springs are riveted or otherwise secured to an endless steel loop or band which may be flanged and to which the tire proper or tread of metal, wood, fibre or rubber is secured.

The brackets at the inner ends of the springs are mounted in a rim adapted to be detachably secured to the wheel felly.

Located between each end of all the springs and the respective cross pins or bolts are endless steel bands or loops which form abutments for the springs and for a cylindrical core of rubber placed in each spring, The top and bottom brackets are provided with side flanges preferably secured in position by the cross-pins or bolts and arranged so that one set slide freely within the other and so that the springs are completely enclosed.

The invention will be more particularly described by the aid of the accompanying drawings, wherein:

Fig. 2 is a cross-section, on the line 2—2 of Figure 1, drawn to an enlarged scale, and Fig. 3 is a detail view of one of the springs.

Figure 1:
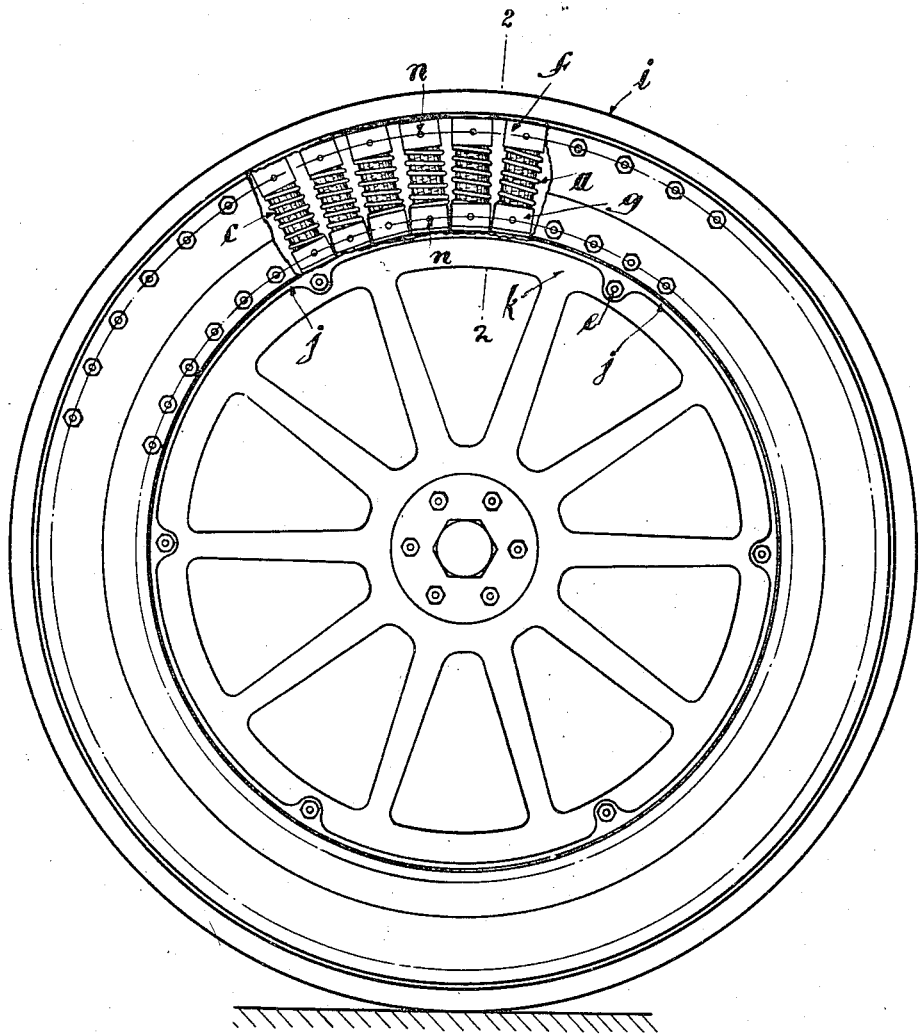
Fig. 1 is a side elevation of a wheel showing a tire (partly in section), constructed according to the invention.

Referring to the drawings, a series of spiral springs $a$ are formed with eyes $b$ at each end and within each spring is placed a cylinder of resilient rubber $c$ which constitutes a core, which imparts lateral rigidity to said springs.

All the springs $a$ are located between two endless steel bands $d$ and $e$ respectively with the eyes $b$ projecting beyond the same. Each spring is carried by separate brackets $f$ at the outer extremity and $g$ at the inner extremity.

The brackets $f$ are riveted to a flanged outer rim $h$ to which a tire or tread $i$ of rubber is secured, while the brackets $g$ are formed with lateral flanged $g^1$ and lie within the flanged rim $j$ which is detachably secured to the wheel felly $k$ by the bolts $l$. To give increased rigidity, the brackets $g$ may be riveted to the rim $j$ at $m$ as shown.

Each spring is secured to its respective bracket $f$ and $g$ by means of the cross-bolts $n$ which pass through holes formed in the limbs of the bracket to receive them and through the eyes $b$ of said springs $a$. Said bolts $n$ also serve to secure the side flanges $o$ to the brackets $g$ and the flanges $p$ to the brackets $f$, the flanges $p$ overlapping the flanges $o$ and completely enclosing the springs.

By these means a resilient tire is obtained giving very efficient springing with the minimum weight and great rigidity both laterally and angularly.

What I claim is:—

1. A spring tire for automobile and like wheels, comprising a plurality of radially arranged spiral springs each formed with an eye at each end, an inner rim adapted for attachment to the wheel felly, a series of brackets attached to said rim and formed with upstanding flanges bored to receive transversely arranged through-bolts, an outer rim, and a series of brackets attached to said rim and formed with upstanding flanges bored to receive transversely arranged through-bolts, bolts passing through all said brackets and the respective spring eyes, and endless steel bands passing around both ends of the springs, substantially as described.

2. A spring tire for automobile and like wheels, comprising a plurality of radially arranged spiral springs each formed with an eye at each end, an inner rim adapted for attachment to the wheel felly, a series of brackets attached to said rim and formed with upstanding flanges, bored to receive transversely arranged through-bolts, an outer rim, and a series of brackets attached to said rim and formed with upstanding flanges bored to receive transversely arranged through bolts, side flanges enclosing the springs, bolts passing through all said brackets and holes formed in the side flanges and the respective eyes of the springs, and endless steel bands passing around both ends of the springs and between the latter and the respective series of through-bolts, substantially as described.

3. A spring tire for automobile and like wheels comprising a plurality of radially arranged spiral springs each formed with an eye at each end, and having a central core of india rubber, an inner rim adapted for attachment to the wheel felly, a series of brackets attached to said rim and formed with upstanding flanges, bored to receive transversely arranged through bolts, an outer rim, and a series of brackets attached to said rim and formed with upstanding flanges bored to receive transversely arranged through bolts, side flanges enclosing the springs, bolts passing through all said brackets, and holes formed in the side flanges and the respective eyes of the springs, and endless steel bands passing around both ends of the springs and between the latter and the respective series of through-bolts, substantially as described..

4. A spring tire for automobile and like wheels comprising a plurality of radially arranged spiral springs each formed with an eye at each end, and having a central core of india rubber, an inner rim adapted for attachment to the wheel felly, a series of brackets attached to said rim and formed with upstanding flanges, bored to receive transversely arranged through-bolts, an outer rim, provided with a rubber tread and a series of brackets attached to said rim and formed with upstanding flanges bored to receive transversely arranged through bolts, side flanges enclosing the springs, bolts passing through all said brackets, and holes formed in the side flanges and the respective eyes of the springs, and endless steel bands passing around both ends of the springs and between the latter and the respective series of through-bolts, substantially as described.

In testimony whereof I have signed my name to this specification.

JOHN LAMB.